United States Patent

[11] 3,595,124

| [72] | Inventors | Robert O. Lindstrand<br>Rockford;<br>Gehle D. Loomis, Rockford; Rudolph C. Kozlik, Roscoe, all of, Ill. |
|---|---|---|
| [21] | Appl. No. | 825,771 |
| [22] | Filed | May 19, 1969 |
| [45] | Patented | July 27, 1971 |
| [73] | Assignee | Keystone Consolidated Industries, Inc.<br>Peoria, Ill. |

[54] CONTROLLED TORQUE BOLT
7 Claims, 8 Drawing Figs.

| [52] | U.S. Cl. | 85/61 |
|---|---|---|
| [51] | Int. Cl. | F16b 31/02 |
| [50] | Field of Search | 85/61;<br>285/2, 4 |

[56] References Cited
UNITED STATES PATENTS

| 1,970,071 | 8/1934 | Bengtsson | 85/61 |
| 2,740,315 | 4/1956 | Gouverneur | 85/61 |
| 3,048,109 | 8/1962 | Feemster | 85/61 |

*Primary Examiner*—Edward C. Allen
*Attorney*—Wilson & Geppert

ABSTRACT: A controlled torque bolt having a threaded shank and a driving head integral with and adapted to shear off of the bolt upon the application of a predetermined torque by a driver upon the driving head. The bolt also includes an enlarged flange or head forming the head of the bolt when secured in the work, the driving head and the enlarged head being integral with the bolt and defined by a fold or undercut therebetween which also defines the plane of shear for the driving head. An alternate embodiment of the bolt positions a washer in the fold or undercut.

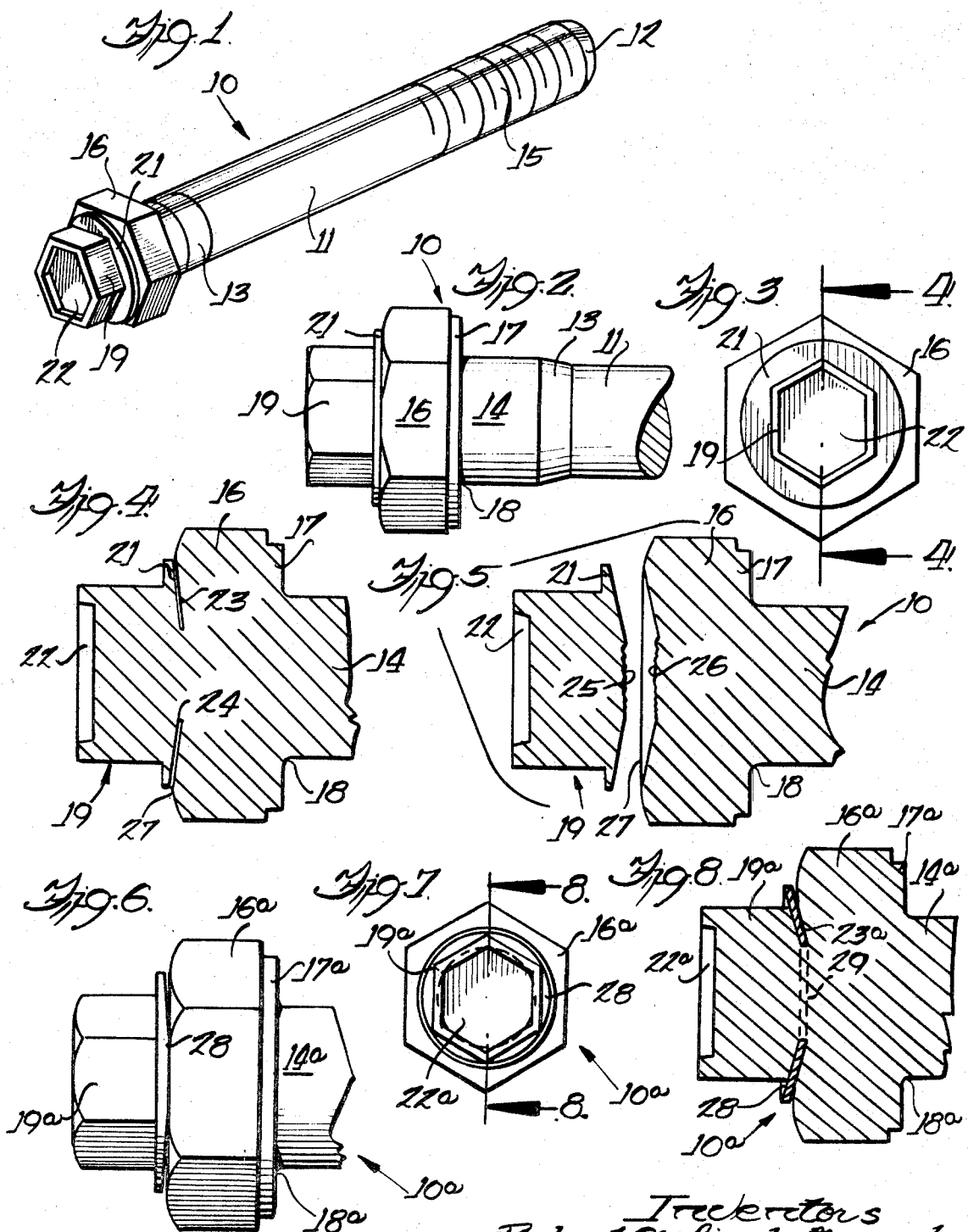

3,595,124

CONTROLLED TORQUE BOLT

The present invention relates to an elongated bolt to be applied to a workpiece and more particularly to a bolt having an enlarged flange or head and a smaller driving head which is adapted to shear off of the bolt at a predetermined torque.

Among the objects of the present invention is the provision of a controlled torque bolt having a driving head which will shear off of the bolt at a predetermined torque. The bolt includes an elongated shank threaded for at least a portion thereof from the free end, an enlarged flange or head integral with the shank and a smaller driving head integral with the enlarged head and shank. The driving head is defined by an undercut or fold between the enlarged head and the driving head, and this undercut will also define the plane of shear.

Another object of the present invention is the provision of a controlled torque bolt having a driving head which will shear off of the bolt accurately at a predetermined torque. Control of the dimensions of the undercut or fold will control the torque value at which the head will shear.

A further object of the present invention is the provision of a controlled torque bolt having a driving head and an enlarged flange or head where the driving head will shear off of the bolt in a plane recessed below the top surface of the enlarged flange or head to provide a generally clean break.

The present invention also comprehends the provision of a controlled torque bolt having an enlarged flange or head and a smaller driving head defined by an undercut or fold and a washer of a suitable material located in the undercut or fold to aid in controlling the torque at which shearing occurs.

Further objects are to provide a construction of maximum simplicity, efficiency, economy and ease of operation, and such further objects, advantages and capabilities as well later more fully appear and are inherently possessed thereby.

In the drawing:

FIG. 1 is a perspective view of the controlled torque bolt of the present invention.

FIG. 2 is a partial side elevational view of the bolt showing the bolthead.

FIG. 3 is an end elevational view of the bolthead.

FIG. 4 is a cross-sectional view of the bolthead taken on the line 4—4 of FIG. 3.

FIG. 5 is a cross-sectional view similar to FIG. 4 but showing the driving head sheared from the bolt.

FIG. 6 is a partial side elevational view of an alternate form of bolt showing the bolthead.

FIG. 7 is an end elevational view of the bolt head of FIG. 6.

FIG. 8 is a cross-sectional view taken on the line 8—8 of FIG. 7.

Referring more particularly to the disclosure in the drawing wherein is shown illustrative embodiments of the present invention, FIG. 1 discloses a bolt 10 adapted to be inserted into a workpiece to join two or more parts together or perform other required functions. The bolt is provided with an elongated cylindrical shank 11 tapered or pointed at the free end 12 and tapered at 13 to provide an enlarged cylindrical portion 14 adjacent the opposite end. The shank 11 is threaded at 15 for the desired portion thereof from the free end 12.

Adjacent the opposite end, the bolt 10 is shown provided with an enlarged polygonal flange or head 16, with a reduced annular shoulder 17 therebelow and joined to the portion 14 by a rounded fillet 18. A smaller, outer driving head 19 of a polygonal configuration with a lower flange 21 and an upper recessed or cupped portion 22 is integral with the enlarged head 16 and defined by an undercut or fold 23 which extends inwardly and slightly inclined downwardly into the enlarged head 16. The inner circumference 24 of the fold 23 acts to define the plane of shear for the driving head 19.

Although shown of a hexagonal configuration, the enlarged head 16 may be circular or any other suitable configuration as it does not act to rotate or drive the bolt 10. The driving head 19 is preferably of hexagonal or other polygonal configuration for ease of engagement and driving; however, the driving head 19 does not need to be in any particular relationship with respect to the enlarged head 16. In operation, the bolt 10 is inserted into the work and a suitable driver engages the driving head 19 to rotate the bolt and provide threaded engagement with the work. When the bolt is properly seated, additional torque or force applied to the driving head 19 will then cause the smaller head to shear off of the bolt 10 at the fold 23 as at 25 (FIG. 5) leaving a relatively clean break 26 on the bolt in a plane slightly below the top surface 27 of the enlarged head 16.

The present invention provides a bolt capable of uniform insertion pressure or force where such is required in assembly operations without the use of a torque wrench. The torque at which the driving head shears from the bolt 10 may be accurately controlled by controlling the extend and dimensions of the undercut or fold 23. Accurate reproducible results as to the shearing at a specified torque can be obtained by the use of this bolt.

FIGS. 6—8 disclose an alternate embodiment of bolt 10$^a$ having an elongated threaded shank, the enlarged cylindrical portion 14$^a$, the enlarged flange or head 16$^a$ and the smaller driving head 19$^a$. However, this bolt is provided with an annular washer 28 which is positioned at and aids in defining the undercut or fold 23$^a$. The washer 28 may be formed of any suitable material, such as steel, aluminum, or a suitable plastic material, which washer is initially an annular member that is deformed in the formation of the undercut or fold 23$^a$ and fills the space created by the fold.

The washer 28 in filling the space of the fold aids in defining the plane of shear 29 for the driving head 19$^a$. In operation, the bolt 10$^a$ functions in the same manner as the bolt 10 previously described. The washer 28, in defining the plane of shear 29, aids in providing a clean break when the driving head 19$^a$ shears off of the bolt 10$^a$, the washer 28 being removed with the driving head 19$^a$.

In both embodiments of the bolt 10 and 10$^a$, the bolt is initially formed as an elongated blank having a reduced diameter end separated by the enlarged flange or head 16 or 16$^a$; the diameter of the end substantially equaling the diameter of the inner circumference 24 of the fold 23 or 23$^a$. If the washer 28 is to be utilized, it is placed over the reduced end and into a recess formed in the face of the flange 16 below the surface 27. The reduced end is then upset to form the head 19 or 19$^a$ and provide the fold 23 or 23$^a$. The washer 28 will be partially deformed to that shown in FIG. 8 during the upsetting operation.

Having thus disclosed our invention, we claim:

1. A controlled torque bolt comprising an elongated cylindrical shank having a free end and threaded for at least a portion of the shank from the free end, an enlarged flange adjacent the opposite end of the shank, and a driving head integral with said enlarged flange at the opposite end of the shank, said head and said flange having annular parallel surfaces extending radially inwardly and inclined downwardly into said flange to terminate at an outer circumference of a reduced diameter shank portion joining the driving head and the enlarged flange.

2. A controlled torque bolt as set forth in claim 1, in which said driving head is of a polygonal contour and said reduced diameter shank portion causes said driving head to shear off of said bolt and flange at a predetermined applied torque.

3. A controlled torque bolt as set forth in claim 1, in which said driving head is of polygonal shape and of a smaller cross-sectional dimension than said flange, said flange being an enlarged polygonal head for the bolt after the driving head has been sheared off.

4. A controlled torque bolt as set forth in claim 1, including an annular washer encompassing said reduced diameter shank portion and positioned between and deformed by said parallel inclined surfaces.

5. A controlled torque bolt as set forth in claim 4, in which the outer circumference of said washer is exposed at the outer surface of said driving head and the inner circumference of the washer defines the outer circumference of said reduced diameter shank portion.

6. A controlled torque bolt as set forth in claim 1, in which the torque value at which said driving head shears off of the bolt is controlled by the diameter of the reduced shank portion between the driving head and the flange.

7. A controlled torque bolt comprising an elongated cylindrical shank having a free end and threaded for at least a portion of the shank from the free end, an enlarged flange adjacent the opposite end of the shank, and a driving head of a polygonal contour integral with said enlarged flange at the opposite end of the shank, said driving head and said flange having annular parallel surfaces extending radially inwardly and inclined downwardly into said flange to terminate at an outer circumference of a reduced diameter shank portion joining the driving head and the enlarged flange, said reduced diameter shank portion causes said driving head to shear off of said bolt and flange at a predetermined applied torque with the shear plane for the bolt defined by the circumference of said reduced diameter shank portion and is located below the top surface of said flange.